United States Patent Office 3,467,596
Patented Sept. 16, 1969

3,467,596
ANTIFRICTION COMPOSITIONS AND METHOD OF APPLYING THE SAME ON A SUBSTRATE
Georges Hermann, Annecy, France, assignor to Societe Industrielle des Coussinets, Paris, France, a French company
No Drawing. Filed Jan. 26, 1967, Ser. No. 611,846
Claims priority, application France, Jan. 17, 1966, 47,033
Int. Cl. C10m 7/52; C08g 51/08
U.S. Cl. 252—12
16 Claims

ABSTRACT OF THE DISCLOSURE

A bearing composition is prepared by mixing a rigid coating resin and a flexible coating resin together with a suitable filler. The rigid coating resin is a single or a combination of the following resins: oil soluble, heat reactive phenolic resins and alkylated amino resins. The flexible coating resin is a single or a combination of the following resins: (1) drying oil modified resoles, (2) silicones and (3) epoxy resins. The preferred fillers are graphite, anhydrous aluminum phosphate, lead sulfide and alkaline borophosphates which have a general formula as follows:

$$P_2O_5 \cdot nB_2O_3 \cdot mM_2O \cdot pH_2O$$

wherein $n$ and $m$ each is in the range between 1.5 and 2,5, $p$ is between 0.5 and 2 and M is an alkali metal. The alkaline borophosphates can also be combined with one or more of the following oxides: $Al_2O$, PbO, MgO, CaO, $Fe_2O_3$ and BeO.

Preferably the rigid-flexible coating resinous mixture is mixed with a plasticizer such as polyethylene glycol having a molecular weight about 400. Other fillers which tend to reduce the coefficient of friction of the bearing composition such as graphite and semimetallic elements such as bismuth, can also be incorporated therein.

In preparing a bearing using the composition of this invention, the composition is first preformed into the desired shape and is then deposited to a metal bearing substrate. The substrate is preferably precoated with polyvinyl butyral to increase the shock resistance of the substrate and is preheated to about 80° to 120° C. The preformed composition deposited on the substrate is heated to a temperature in the range between 40° and 70° C. and is rolled to the desired thickness thereby causing the bearing composition to laminate onto the substrate. After the lamination, a very thick coating of a surfacing agent, such as graphite powder, is applied to the laminate on the polymeric surface. The thus coated laminate is cured by baking at a temperature in the range between 180° and 300° C. The cured laminate is then subjected to a conventional molding or shaping process to form a bearing of the desired configuration and dimension.

Background of the invention

Field of the invention.—This invention relates to a bearing composition and the method for preparing the bearing from the same. More particularly, the invention relates to a composition having a mixture of compatible resins wherein at least one of said resins is a rigid coating resin and at least one is a flexible coating resin, and a suitable filler. The composition is suitable for preparing supported bearing wherein a metal bearing substrate is used.

Description of the prior art

Bearings, particularly the self-lubricating ones, were prepared, heretofore, by incorporating in a polymeric matrix, a suitable filler so the resultant compositions could have desirable physical characteristics. The synthetic resins used in the prior art included phenolic polyfluorocarbonate, epoxy, silicone, polyamide, polyoxymethylene, polyurethane, polycarbonate and alkyd resins. The fillers used, heretofore, included polytetrafluoroethylene, iron, lead, tin, copper, bronze, mica, asbestos, lead or iron oxides.

Although the existing bearing compositions each has its own merits, all have certain inadequacies and oftentimes even serious disadvantages under certain working conditions. Compositions using thermoplastic resins, for example, generally show a rapid rise in coefficients of friction with increasing temperature. Compositions using thermosetting resins, on the other hand, lack the necessary flexibility and adhesion and the cross-linking agents used therefor, render the compositions thermal sensitive and also sensitive to creep. Some of the fillers may also cause the compositions to be unstable and fusible and may be incompatible with binders. For example, lead powder or lead oxides cause polymerization of drying oil modified phenolic resin and certain silicones. The deficiencies of the prior bearing compositions include thermal sensitivities which limit their application to temperatures below 130° C.; rigidity or inability to be molded which increases the fabrication cost; low resistance to environmental conditions such as low temperature, hot water, acids, bases, oils and solvents; and inability or difficulty in bonding to metal bearing substrates which leads to the required use of more expansive mechanical bracing.

Summary of the invention

I have now found that the deficiencies of the prior bearing compositions can be overcome using the bearing composition of this invention. Broadly stated, the composition comprises a rigid coating resin, a flexible coating resin and a suitable filler. The rigid coating resin can be a single or a mixture of resins selected from the group consisting of oil soluble, heat reactive phenolic resins and alkylated amino resin. The flexible coating resin, similarly, can be a single or a mixture of resins selected from the group consisting of drying oil modified resoles, silicones and epoxy resins.

The suitable oil soluble, heat reactive phenolic resins include phenol-formaldehyde resins derived from preferably para-substituted phenols, alcohol modified resoles, and polyester plasticized resoles. The para-substituted phenols that can be used to prepare the oil soluble, heat reactive phenolic resins, include, for example p-phenol, p-cyclohexylphenol, p,p'-hydroxydiphenoldimethylmethane, p-tert.-butylphenol and p-tert.-amylphenol. The phenolic resins derived from p-substituted phenols are compatible with epoxy resins and are used to provide hardness to the bearing composition.

The alcohol modified resoles, which are also known as modified A-stage resins are prepared by condensing a phenol and formaldehyde in an alkaline medium. The resoles thus obtained are modified by reacting them with suitable alcohols such as p-tert.-butanol and benzyl alcohol. The modified resoles are soluble in oils, ketones and aromatic hydrocarbons and contrary to the unmodified resoles, are substantially insoluble in alcohols. The alcohol modified resoles are compatible with epoxy resins and are capable of providing the plastic mass a higher fluidity and also promoting the plastic mass to adhere better to metals.

The polyester plasticized resoles are soluble in oils and aromatic hydrocarbons and are compatible with amino resins and high molecular weight epoxy resins. Suitable polyesters are prepared by reacting saturated or unsaturated polyacids with long carbon chains such as adipic acids with polyalcohols such as ethyleneglycol and propyleneglycol. Among the polyesters that can be used, I found diethyleneglycol adipate to be eminently suitable. The polyester imparts the required plasticity in the resoles and the resultant phenolic resins have higher mechanical and chemical resistances.

The alkylated amino resins suitable as a rigid coating resin are the alkylated melamines and particularly the one with a maximum degree of alkylation, obtained by reacting all six methyol groups of hexamethylolmelamine with methyl alcohol. The resultant product, called hexa(methoxymethyl)melamine is available commercially. The alkylated melamine renders the heat-treated bearing composition highly resistant to acids, bases, detergents and solvents. It is reactive with a great variety of other resins and is entirely compatible and can be mixed with all the rigid and flexible resins suitable for the present invention.

The drying oil modified resoles of the flexible type of coating resins are prepared by reacting resoles with vegetable drying oils possessing conjugated double bonds and possibly a ketone radical. Vegetable dry oils of this type include tung oil and rosin.

Silicones suitable are the type commonly referred to as "intermediate" resins, which cannot be cross-linked by themselves, but are capable of copolymerizing with other hydroxyl groups containing resins such as phenolic and epoxy resins. Among the silicones suitable, I found the siloxanes and particularly dimethyltriphenyltrimethoxysiloxane to be preferred. Silicones in the bearing composition tend to increase the thermal resistance of the cured compositions.

Epoxy resins which, when incorporated in the bearing composition, will provide the cured product with an exceptionally high chemical resistance, excellent mechanical properties and good dimensional stability. The preferred flexible epoxy coating resins are prepared by condensing epichlorohydrin and diphenylpropane in an alkaline medium and have a molecular weight in a range between 470 and 3800 and preferably between 2000 and 3000.

All the rigid and flexible coating resins described hereinabove are available commercially. When silicones and epoxy resins are used for preparing the bearing compositions of this invention, it is advantageous to cure them at the time of use with suitable curing agents well known to one skilled in the art.

It is important to note that the bearing composition of this invention has unique physical and chemical properties which are not the results of compromising the desirable properties of the constituents but, rather, of a synergistic aggregation of these properties. Hence, the unique bearing composition of this invention has properties heretofore not found in any single bearing composition. Some of the important properties of the bearing composition of this invention are as follows:

(a) High resistance to chemicals;
(b) High density and absence of porosity;
(c) Good heat stability up to approximately 200° C.;
(d) Desirable combined properties of required hardness and flexibility;
(e) Good adhesion to metals and, in particular to ferrous metals and light alloys;
(f) Excellent abrasion resistance;
(g) Low coefficient of friction;
(h) Proper consistence of the pre-cured bearing composition adaptable for use in a continuous process;
(i) High wear resistance and hence requiring only a relatively thin layer which in turn avoids local overheating; and
(j) Suitable for shaping and molding operations in the manufacturing of lined-bearings.

Advantageously, the bearing composition according to this invention, is used for preparing bearings of the type having a metal bearing substrate. The method for preparing bearings of this type comprises the following steps: The composition of this invention is first prepared by mixing the various constituents and after which the mixture is preformed into the desired shape by extrusion, pressing, drawing or any other suitable method. Preferably, the shape of the preformed bearing composition conforms to approximately the final shape and dimension of the resultant bearing.

The preformed bearing composition is now deposited on a metal bearing substrate which is preferably pretreated in a usual cleaning, rinsing, drying and heating sequential operation and has received a primary coating comprising, preferably, polyvinyl butyral. The polyvinyl butyral, which is coated on the substrate to increase the shock resistance is applied thereto in the form of a coating solution and the solvents therefor are evaporated by proper heating of the coated substrate. The metal substrate is preheated preferably to a temperature in the range between 80° and 120° C.

After the preformed bearing composition is initially deposited to the preheated and pretreated metal substrate, the temperature is maintained at a range between 40° and 70° C. for a period sufficient to allow the plastic mass to spread over the substrate and to conform thereto. Rolling or other types of processes can be used to laminate the layer or layers of bearing compositions on the metal substrate and to provide a proper final thickness.

After the lamination, a thin film of surfacing agent, such as graphite and tungsten sulfide are preferably coated on the plastic surface. The thus prepared bearing is then baked at a temperature between 180° and 300° C. using any suitable heating means such as infrared lamps. During the heating period, the solvent in the bearing composition is initially vaporized and after which the composition starts gelling, followed by hardening and finally crosslinking. The metal bearing lined with the new composition is now ready to undergo different molding and shaping operations well known in the art to form the desired shapes and dimensions.

Description of the preferred embodiments

The resin base of the present bearing composition is prepared by blending one or more types of rigid coating resins with one or more flexible coating resins. There is no apparent critical limitation on the proportion of rigid and flexible resins that can be used. In fact, the ratio of rigid and flexible resins can vary within a wide range and its selection is based on the desired qualities of hardness and flexibility in the resultant composition. To obtain optimum results, however, requires proper blending of the resins. I have found the proportions of rigid and flexible resins listed in Table I provide very high performance.

TABLE I

| Composition rigid Resins | (Pts. by wt.) | Flexible Resins | (Pts. by wt.) |
| --- | --- | --- | --- |
| (A) p-phenol-formaldehyde resin alcohol modified resole | 40-48 35-40 | Epoxy resin | 100 |
| (B) p-Phenol-formaldehyde resin | 100 | Drying oil modified resole | 40-50 |
| (C) Polyester plasticized resole | 100 | ...do | 75-85 |
| (D) p-Phenol-formaldehyde resin | 40-48 | Epoxy resin | 100 |
| (E) Alcohol modified resole | 100 | Silicone/epoxy resin | 45-55/220-280 |
| (F) p-Phenol-formaldehyde/alcohol modified resole | 20-28/18-22 | Silicone | 20 |
| | | Epoxy resin | 100 |
| (G) Hexamethoxymethylmelamine | 5-10 | Silicone/epoxy resin | 6-9 100 |

Unmodified silicones in solvent may be added to any one of the above compositions to improve their resistance to temperature, boiling water, etc. if desired. Advantageously plasticizers, such as ethyleneglycol polymers having a molecular weight in the range preferably between 200 and 6000 may be also incorporated in these compositions. I have found the plasticizers of this type serves also as wetting agents during the application of the composition to the metal base. An example of ethyleneglycol polymers that I found to be eminently suitable is Carbowax 400 manufactured by the Union Carbide Chemical Company.

Added to and mixed with the resinous mixture, can be a number of fillers well known in the art and some of which are referred to hereinabove. The amount of filler to be used to prepare the composition of this invention, depends on a number of factors such as compatibility and physical and chemical characteristics. I have found certain fillers used alone, or in combination provide excellent results. These fillers are as follows:

(a) Neutral anhydrous aluminum phosphate;
(b) Lead sulfide;
(c) Graphite; and
(d) Alkaline borophosphate.

The amount of aluminum phosphate that can be used can range up to 20% by weight of the rigid-flexible resinous mixture. The lead sulfide can be natural lead sulfide if it is sufficiently pure and silica free. It is preferred to use synthetic galena with 11.4% sulfur—in an amount up to 15% by weight of the resinous mixture. The graphite which may be natural or synthetic, is preferably finely powdered and the amount used may range up to about 5% by weight of the resins.

The preferred alkaline borophosphates have the following general formula:

$$P_2O_5 \cdot nB_2O_3 \cdot mM_2O \cdot pH_2O$$

wherein $n$ and $m$ each range from 1.5 to 2.5, $p$ from 0.5 to 2 and M is an alkali metal.

The borophosphate can be combined with at least one of the following oxides: $Al_2O_3$, $PbO$, $MgO$, $CaO$, $Fe_2O_3$ and $BeO$. The specific method for preparing these borophosphates is described in my French Patent No. 1,380,678, issued on October 22, 1963. Particularly good results were obtained with borophosphates containing maximum amounts of Mg and Al ions. A specific borophosphate composition that I found to be eminently suitable has the following compositions:

| | Percent |
|---|---|
| $P_2O_5$ | 46.71 |
| $B_2O_3$ | 21.13 |
| $Na_2O$ | 18.82 |
| $MgO$ | 8.15 |
| $Al_2O_3$ | 5.17 |

This composition will be referred to hereinafter as P-diborophosphate.

In addition to the fillers, other adjuvants can be used to facilitate the preparation of the bearing composition, to increase the adhesion of the composition to the metal substrate and to improve the final characteristics of the bearings. Among such adjuvants are formal and polyvinyl butyral, up to 5% by weight based on the resinous mixture of which can be used. A lubricating agent capable of reducing the coefficient of friction also is preferably used as an adjuvant for preparing the bearings. Suitable lubricating agents are graphite or a semimetallic element of Group V of the Periodic Table, such as bismuth. The amount of lubricating agent that can be used is in the range of 1% to 5%.

The various resins suitable for preparing the composition of this invention are available in many different forms. To facilitate the understanding of this invention, a preferred form of each of these resins is set forth hereinbelow. These resins are identified as follows by a number and will be referred to as such in subsequent descriptions.

No. 1—An approximately 50% solution of a phenol-formaldehyde resin derived from para-substituted phenol in a butanol-xylene mixture;

No. 2—A 67%–70% solution of a p-tert.-butanol or a benzyl alcohol modified resole in a butanol-xylene mixture;

No. 3—An approximately 75% solution in the form of a viscous liquid of rosin modified resole in a butanol-xylene mixture;

No. 4—An approximately 70% solution of a tung oil modified resole in a butanol-xylene mixture;

No. 5—An approximately 60% solution of a diethyleneglycol-adipate plasticized resole in a butanol-xylene xylene mixture;

No. 6—An approximately 50% solution of dimethyltriphenytrimethoxysiloxane in a butanol-xylene mixture;

No. 7—A solvent free unmodified silicone;

No. 8—An approximately 50% solution of an epoxy resin derived from the condensation of epichlorohydrin and diphenylpropane in an alkaline medium and having a molecular weight in the range to 2000–3000 in cyclohexanone;

No. 9—An approximately 20% solution of polyvinyl butyral assayed between 9 and 13% polyvinyl alcohol in cyclohexanone; and No. 10—Solvent free hexamethoxymethylmelamine.

Examples of various combinations of these resins to form a suitable rigid-flexible resinous mixture are tabulated in Table II.

TABLE II

| | Mixture of resins (ref. to the number of the resins) | Ratios of resins by weight |
|---|---|---|
| Examples: | | |
| I | No. 4 and No. 6 | 1:0.8 |
| II | No. 8 and No. 5 | 1:0.4 |
| III | No. 8 and No. 2 | 1:0.72 |
| IV | No. 8, No. 1 and No. 2 | 1:0.4:0.4 |
| V | No. 8, No. 1, No. 2 and No. 9 | 1:0.42:0.4:0.05 |
| VI | No. 8, No. 2, No. 5 | 1:0.36:0.4 |
| VII | No. 1 and No. 4 | 1:0.575 |
| VIII | No. 1 and No. 3 | 1:0.45 |
| IX | No. 8, No. 5 and No. 3 | 1:04:0.32 |
| X | No. 8, No. 1 and No. 3 | 1:0.5:0.32 |
| XI | No. 8, No. 1, No. 2 and No. 7 | 1:0.24:0.4:0.2 |
| XII | No. 8, No. 7, No. 10 and No. 9 | 1:0.07:0.125:0.05 |

Using these rigid-flexible resinous mixtures, the following bearing compositons, which have excellent properties, were prepared. These compositions are set forth in Table III.

TABLE III.—BEARING COMPOSITIONS

| Composition: | Mixture of resins (ident. as example) | Filler | Weight ratios (per 100 parts resin) |
|---|---|---|---|
| A | VIII | p-Diborophosphate | 20-45 parts filler. |
| B | I | ...do... | Do. |
| C | IV | Synthetic gelena and AlPO₄ (aluminum phosphate) | 4-16 gelena and 10-25 aluminum phosphate. |
| D | IX | Synthetic gelena and (aluminum phosphate) AlPO₄ | 4-16 gelena and 10-27 aluminum phosphate. |
| F | III | Synthetic gelena and AlPO₄ (aluminum phosphate) | 4-17 gelena and 11-28 aluminum phosphate. |
| G | XII | Synthetic gelena and AlPO₄ (aluminum phosphate) | 4-15 gelena and 10-25 aluminum phosphate. |

Lubricating agents such as graphite and bismuth can be added to the above-tabulated compositions to provide the desired characteristics. An addition of 0.4% to 3% by weight of bismuth to the compositon designated as A, for example, produces an excellent bearing composition of this invention. Similar results were obtained by adding graphite to Compositions C, D, E, F and G, in an amount equivalent to 0.4 to 3% by weight of the composition.

The composition of this invention may be prepared in different ways. A simple method involves the mixing of the rigid and flexible resins in solvent with, if desired, a plasticizer and adjuvants, such as polyvinyl butyral in suitable ratios to form a liquid resinous solution. After thorough mixing, a sufficient amount of solvent is preferably evaporated until the mixture reaches a pasty or highly viscous consistency. Fillers are then added to the resinous paste and are thoroughly mixed therewith by a suitable mixer. Finally the mixture is subjected to a physical plasticization process in a heated multicylinder grinder.

The bearing composition thus prepared is in the form of a mastic still containing a small percentage of volatile solvents suitable for application to a metal substrate for forming a bearing. The bearing composition is in a consistency which facilitates its application to the metal substrate by a conventional method such as by extrusion, drawing or pressing. A preferred method for applying the composition of this invention is described under the heading "Summary of the Invention" and is not repeated here.

Further to illustrate this invention, specific additional examples are described hereinbelow with reference to the resins identified by specific designated numbers.

Example XIII 110 parts by weight of resin No. 1, 105 parts resin No. 2, 275 parts resin No. 8 and 10 parts of polyethyleneglycol (M.W. 400), were successively added into a stainless mixer while the agitator was operating. After the resinous components and plasticizer were thoroughly mixed, approximately 125 parts of solvents were eliminated by heating the mixer to about 120° C. under constant agitation. hereafter, the mixture was cooled and was followed by the addition of 5 parts by weight of graphite, 50 parts of lead sulfide (produced by dry process), 50 parts of anhydrous aluminum phosphate, and 50 parts of P-diboro-phosphate.

After the addition of the fillers, the agitation was continued until a coarse rudimentary mixture was obtained. After mixing, the plastic mass was subjected to a physical plasticization operation by passing it through a heated a heated multicylinder grinder.

The mastic coming out of the grinder was fed into a screw press maintained at 50° C. and cylinders measured 600 mm. long and 4 mm. in diameter were extruded therefrom. Each of the cylinders thus obtained was laid on a soft steel bearing substrate measured 500 mm. long, 30 mm. wide and 1.375 mm. thick, with its longitudinal axis along the length of the substrate. The steel bearing substrate had been properly cleaned, dried and preheated to about 100° C. prior to the laying of the bearing composition thereon.

The mastic cylinder was rolled on the steel bearing substrate so it was roughly conformed to the shape of the substrate. The mastic so applied, was reheated by infrared radiation until its temperature reached 60° C. The final thickness of the bearing was adjusted by subjecting the lined bearing to two successive rolling operations. The final thickness of the combined liner and substrate was 1.7 mm. The plastic mass that overlapped the substrate was trimmed and a very thin film of graphite was applied on the plastic surface with a wad or cloth.

Subsequent to graphite coating, the lined bearing was baked with infrared radiation until the resins were polymerized. Finally, the bearing was heated for 20 minutes at an average temperature of 270° C.

The final thickness of the bearing was 1.675 mm. of which $3/10$ mm. were contributed by the bearing composition.

The band so coated was made into a U-shape bearing with the lining being inside. This bearing was tested with a load of 3 daN per cm.$^2$ of projected area using a steel shaft 45 mm. in diameter and rotating at a speed of 3100 r.p.m. The friction exerted on bearing dry. After 25 seconds of initial starting period, the test ran for 10 hours. Inspection of the bearing lining after this period, showed no appreciable wear and the temperature during the test remained substantially constant at 135° C.

Example XIV

In this example the following materials were used for preparing the bearing composition using the same procedures as described in the previous example.

Resins: Parts by weight
No. 1 _____ 110
No. 2 _____ 105
No. 8 _____ 275
No. 9 _____ 20
Plasticizer:
Polyethyleneglycol (M.W. 400) _____ 10
Fillers:
Graphite _____ 5
Lead sulfide _____ 50
Anhydrous aluminum phosphate _____ 50

The coated band was shaped on a press into a cylinder ring, measured 30 mm. in inner diameter and 10 mm. long, with the lining being on the inside. The ring was tested for wear using an AD3Z steel shaft turning at 60 r.p.m. A load of 1,000 daN was applied to the ring to produce a unit pressure of approximately 166 bars. During the test period, the temperature of the shaft was not exceeding 45° C. and after 1500 hours, no substantial amount of wear was observed.

Example XV

A bearing composition was prepared in a manner similar to Example XIII, with the exception that 145 parts by weight of solvent were evaporated using a resinous mixture and plasticizer of Example XIV and the following fillers:

Parts by weight
Graphite _____ 5
Lead sulfide _____ 50
P-diborophosphate _____ 50

The resultant bearing was tested in the same manner as in Example XIII. No substantial wear was observed after a test period of 9½ hours after a starting period of 30 minutes. The temperature of the shaft was approximately 135° C.

Example XVI 60 parts by weight of resin No. 1, 100 parts of resin No. 2, 250 parts of resin No. 8, 50 parts of resin No. 7 and 10 parts of polyethyleneglycol (M.W. 400) were mixed in the same manner as described in the preceding examples. After thorough mixing, about 125 parts by weight of solvents were evaporated by heating the mixture to a temperature about 120° C. under constant agitation.

After the mixture was cooled, the following fillers were added therein:

Parts by weight
Graphite _____ 6.5
Lead sulfide _____ 25
Anhydrous aluminum phosphate _____ 100

The bearing composition was used to prepare a bearing band in the same manner as in previous examples. The resultant band, which measured 500 mm. long, was tested by immersing half of its length in a bath with constant boiling water level (tap water). After 400 hours, the deposits on the immersed portion of the band were removed and the thickness of the band was measured. The average of 6 values was 1.677 mm. as compared to an original thickness of 1.675 mm. The above test shows that the bearing composition had undergone practically no expansion in boiling water.

Example XVII 180 parts by weight of resin No. 2 and 250 parts of resin No. 8, and 5 parts of polyethyleneglycol (M.W. 400) were mixed in the same manner as described in previous examples and after which 115 parts of solvents were evaporated. After cooling, 5 parts of graphite, 75 parts of lead sulfide, 75 parts of natural anhydrous aluminum phosphate were added to the resinous mixture for preparing the bearing composition.

A bearing band was prepared and a ring was formed therefrom in a similar manner as described previously. The ring thus formed was subjected to a cycle load of 178 daN per cm.$^2$ of projected area and withstood 1,300,000 cycles without abnormal wear.

Example XIX 50 parts by weight of resin No. 10, 30 parts of resin No. 7, 400 parts of resin No. 8, 25 parts of resin No. 9 and 10 parts of polyethyleneglycol (M.W. 400) were mixed in a manner described after which 5 parts of graphite, 50 parts of lead sulfide and 75 parts of neutral anhydrous aluminum phosphate were added therein. The same sequence of operations were used to prepare a bearing band and the same fatigue and wear tests as in the immediately previous examples were made. After 1,400,000 cycles, no abnormal wear of the rings was observed.

Example XX 50 parts by weight of resin No. 10, 30 parts of resin No. 7, 400 parts of resin No. 8, 25 parts of resin No. 9 and 10 parts of polyethyleneglycol (M.W. 400) were mixed, and after which, 135 parts of solvent were evaporated by heating up to 120° C. under constant agitation. After the mixture was cooled, 5 parts of graphite, 10 parts of molybdenum sulfide powder, 40 parts of lead sulfide and 75 parts of neutral anhydrous aluminum phosphate were added therein. A bearing band was prepared therefrom using the same sequence of operations as described. A test band of 125 mm. long and 25 mm. wide was cut off from the bearing band, which was used in an adhesion test. A length of 200 mm. of one of the ends of the test piece was kept horizontally clamped on a stationary part of the torsion machine and a length of 20 mm. of the other end was clamped over on the moving part of the same machine. A 180° twist was applied and followed by 7 alternating 360° twists. After the test, the test piece was examined and showed no trace of separation of the lining from the metal substrate.

Example XXI 10 parts by weight of resin No. 10, 6 parts of resin No. 7, 40 parts of resin No. 8, 40 parts of cyclohexanone, 2 parts of polyethyleneglycol (M.W. 400) and 5 parts of resin No. 9 were initially mixed and after which 1 part of graphite, 10 parts of lead sulfide, and 15 parts of neutral anhydrous aluminum phosphate were added therein for preparing a bearing coating composition. In the course of preparing the composition, 29 parts by weight of solvents were evaporated therefrom.

A bearing band was prepared in a manner similar to Example XIII and was used to form a ring with the following dimensions:

|  | Mm. |
|---|---|
| Thickness of the steel substrate | 1.32 |
| Nominal thickness of the lining | 0.254 |
| Internal diameter | 15.113 |
| Length | 25.4 |

The ring was tested using a soft steel shaft having a diametrical play of 0.635 mm. and under a static load of 43,500 kg. The shaft was lubricated with Rotella oil 10W and was turning at 750 f.p.m. The bearing ran for 1200 hours under a load of 40,000 PV in which P is the load in kg./cm.$^2$ of projected area and V is $\pi$ times the diameter multiplied by the r.p.m.

I claim:
1. A bearing composition comprising (1) at least one rigid coating resin selected from the group consisting of (a) oil soluble, heat reactive phenolic resins and (b) alkylated amino resins, (II) at least one flexible coating resin selected from the group consisting of (c) drying oil modified resoles, (f) silicones and (g) epoxy resins, and (III) a filler selected from the group consisting of neutral anhydrous aluminum phosphate, lead sulfide, fine powdered neutral or synthetic graphite, and alkaline borophosphates.

2. A composition of claim 1 wherein said (a) oil soluble, heat reactive phenolic resins are (i) phenolformaldehyde resins prepared from para-substituted phenols (ii) alcohol modified resoles soluble in oils, ketones and aromatic hydrocarbons and substantially insoluble in alcohols and (iii) polyester plasticized resoles soluble in oils and aromatic hydrocarbons and compatible with amino resins and high molecular weight epoxy resins and said (b) is hexa(methoxymethyl)melamine.

3. A composition of claim 1 wherein there is a plasticizer selected from the group consisting of ethyleneglycol polymers having a molecular weight between 200 and 6000.

4. A composition of claim 1 wherein the alkaline borophosphates have the general formula:

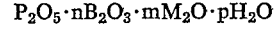

wherein $n$ and $m$ each is within the range between 1.5 and 2.5, $p$ is from 0.5 to 2.0 and M is an alkali metal.

5. A composition of claim 4 wherein said alkaline borophosphate combine with at least one of the following oxides: $Al_2O_3$, PbO, MgO, CaO, $Fe_2O_3$ and BeO.

6. A bearing composition comprising (I) a mixture of (a) an oil soluble, heat reactive phenol-formaldehyde resin prepared from para-substituted phenol, and (b) an alcohol modified resole soluble in oils, ketones and aromatic hydrocarbons and substantially insoluble in alcohols, (II) an epoxy resin prepared from condensing epichlorohydrin and diphenylpropane in an alkaline medium and having a molecular weight in the range between 470 and 3800, (III) polyethylene-glycol, and (IV) a filler selected from the group consisting of neutral anhydrous aluminum phosphate, lead sulfide, fine powdered neutral or synthetic graphite, and alkaline borophosphates.

7. A composition according to claim 6 having therein anhydrous aluminum phosphate and low viscosity polyvinyl butyral having 9% to 13% by weight of a polyvinyl alcohol.

8. A bearing composition comprising (I) a mixture of (a) an oil soluble, heat reactive phenol formaldehyde resin prepared from para-substituted phenol, and (b) an alcohol modified resole soluble in oils, ketones, and aromatic hydrocarbons and substantially insoluble in alcohols, (II) a mixture of (c) an epoxy resin prepared from condensing epichlorohydrin and diphenyl propane in an alkaline medium and having a molecular weight in the range between 470 and 3800 and (d) solvent free dimethyltriphenyltrimethoxysiloxane, (III) polyethyleneglycol and (IV) a filler comprising at least one of the following materials: graphite, lead sulfide, anhydrous aluminum phosphates, and alkaline borophosphates.

9. A bearing composition comprising (I) an alcohol modified resole soluble in oils, ketones, and aromatic hydrocarbons and substantially insoluble in alcohols, (II) an epoxy resin prepared from condensing epichlorohydrin and diphenyl propane in an alkaline medium and having a molecular weight in the range between 470 and 3800 and (III) polyethylene glycol having a molecular weight of about 400 and (IV) a filler comprising at least one of the following materials: graphite, lead sulfide, anhydrous aluminum phosphate, and alkaline borophosphates.

10. A bearing composition comprising (I) hexamethoxymethylmelamine and (II) a mixture of (a) an epoxy resin prepared from condensing epichlorohydrin and diphenyl propane in an alkaline medium and having a molecular weight in the range of 470 and 3800 and (b) solvent free dimethyltriphenyltrimethoxysiloxane, (III) polyethylene glycol, low viscosity polyvinyl butyral having 9% to 13% by weight of polyvinyl alcohol and (IV) a filler comprising a mixture selected from at least one of the following groups: (i) graphite, (ii) lead sulfide, (iii) anhydrous aluminum phosphate, (iv) alkaline borophosphates, and (V) molybdenum sulfide.

11. A method for preparing a bearing which comprises preparing a bearing composition, comprising (1) at least one rigid coating resin selected from the group consisting of (a) oil soluble heat reactive phenolic resins and (b) alkylated amino resins, (2) at least one flexible coating resin selected from the group consisting of (c) drying oil modified resoles, (d) silicones and (e) epoxy resins, and (3) a filler selected from the group consisting of graphite, lead sulfide, anhydrous aluminum phosphate, and alkaline borophosphates, forming a liner from said composition, laminating said liner to a preheated metal bearing substrate, and curing the resultant laminate at a temperature between 180° and 300° C.

12. A method according to claim 11 wherein said metal bearing substrate is precoated with a layer of polyvinyl butyral and the precoat substrate is then heated to a temperature in the range between 80° to 120° C. prior to lamination.

13. A method according to claim 12 wherein a thin layer of surfacing agent selected from graphite and semimetallic elements of Group V of the Periodic Table having low coefficient of friction is coated on the laminate prior to curing.

14. A bearing comprising a metallic bearing substrate and a liner laminated on said substrate, said liner being a cured bearing composition comprising (1) at least one rigid coating resin selected from the group consisting of (a) oil soluble, heat reactive phenolic resins and (b) alkylated amino resins, (2) at least one flexible coating resin selected from the group consisting of (c) drying oil modified resoles, (d) silicones and (e) epoxy resins, and (3) a filler selected from the group consisting of graphite, lead sulfide, anhydrous aluminum phosphate, and alkaline borophosphates.

15. A bearing according to claim 14 wherein a thin layer of surfacing agent selected from the group consisting of graphite and semimetallic elements of Group V of the Periodic Table having a low coefficient of friction is coated and cured onto the liner.

16. A bearing according to claim 15 wherein the metal substrate has thereon a layer of polyvinylbutyrate laminated between said liner and the substrate.

References Cited

UNITED STATES PATENTS

| | | | |
|---|---|---|---|
| 1,077,698 | 11/1913 | Gleason | 252—12 |
| 2,214,104 | 9/1940 | Hildabolt et al. | 252—12 |
| 2,416,480 | 2/1947 | Henry et al. | 252—12 |
| 2,581,301 | 1/1952 | Saywell | 252—12 |
| 2,700,623 | 1/1955 | Hall | 252—12 |
| 2,956,848 | 10/1960 | St. Clair | 252—12 |
| 3,135,564 | 6/1964 | Agens | 252—12 |
| 3,171,699 | 3/1965 | Maxey | 252—12 |
| 3,242,076 | 3/1966 | Hagan | 252—12 |
| 3,346,490 | 10/1967 | Eschen | 252—12.4 |

DANIEL E. WYMAN, Primary Examiner

I. VAUGHN, Assistant Examiner

U.S. Cl. X.R.

156—322; 260—38, 39